United States Patent
Yoshikawa et al.

(10) Patent No.: US 6,806,990 B2
(45) Date of Patent: Oct. 19, 2004

(54) OPTICAL DEVICE AND METHOD FOR PRODUCING OPTICAL DEVICE

(75) Inventors: Hiroki Yoshikawa, Gunma (JP); Masatoshi Ishii, Fukui (JP); Shigeru Konishi, Gunma (JP); Toru Shirasaki, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/302,160

(22) Filed: Nov. 21, 2002

(65) Prior Publication Data

US 2003/0124328 A1 Jul. 3, 2003

(30) Foreign Application Priority Data

Nov. 22, 2001 (JP) .......................................... 2001-358538
Dec. 26, 2001 (JP) .......................................... 2001-395064

(51) Int. Cl.$^7$ ................................................ G20B 6/13
(52) U.S. Cl. ...................................... 359/281; 359/282
(58) Field of Search ................................. 359/281, 282, 359/283, 280

(56) References Cited

FOREIGN PATENT DOCUMENTS

| JP | 06-075189 | 3/1994 |
|---|---|---|
| JP | 07-220923 | 8/1995 |
| JP | 2000-056265 | 2/2000 |

Primary Examiner—Scott J. Sugarman
Assistant Examiner—Richard Hanig
(74) Attorney, Agent, or Firm—Hogan & Hartson LLP (57) ABSTRACT

There is provided A method for producing an optical device by bonding optical elements each other without using adhesive wherein the optical elements are bonded each other by using optical elements in which the relation between linear expansion coefficients $\alpha1$ and $\alpha2$ (/° C.) of each of the optical elements to be bonded and thickness t2 (m) of one of the optical elements satisfies the following formula: $|(\alpha1-\alpha2) \times t2| \leq 10^{-9}$ and $t2 \geq 2 \times 10^{-5}$; and/or, by sticking the optical elements each other in the state of being heated, and then subjecting them to a heat treatment. There can be provided a small size and highly reliable optical devise by bonding optical elements each other without using an adhesive at a low cost.

13 Claims, 7 Drawing Sheets

OPTICAL DEVICE AND METHOD FOR PRODUCING OPTICAL DEVICE

TECHNICAL FIELD

The present invention relates to an optical device of which optical elements are bonded without using adhesive, and a method for producing an optical device.

BACKGROUND ART

In recent years, an optical communication system has become of high integration according to increasing the number of wavelength in WDM (Wavelength Division Multiplex). Consequently, demand on miniaturization of an optical device used for it has also been increased. In many cases, optical devices are composed of combinations of bonded bodies formed by bonding optical elements such as a Faraday rotator and polarizers to a fixing member. However, according to this method, a fixing member is an obstacle, which hinders the miniaturization of optical devices. Accordingly, it has been considered a method such that a fixing member is omitted and optical elements are bonded to each other.

The easiest method for bonding optical elements each other is to bond them by using organic adhesive. For example, Japanese Patent Laid-open Publication No. 6-75189 discloses an optical isolator wherein optical elements are adhered each other using organic adhesive such as resin to be unified. However, it has a disadvantage that use of the organic adhesive causes generation of outgas, which adversely affects a laser diode. Furthermore, the organic adhesive is easily affected by irradiation of high energy laser and exposure to atmosphere of high temperature and high humidity, and therefore it may causes low reliability to the device.

Accordingly, there have been investigated various methods of bonding optical elements each other without using organic adhesive. For example, there is a method of bonding optical elements by using low-melting glass or solder as inorganic bonding material. Low-melting glass is a glass for bonding of which the main component is a low-melting point material such as $B_2O_3$, PbO, or the like. It is necessary to heat to higher temperature than the softening point of the glass at a time of bonding using it. Moreover, although it is effective to bond light transmissive surfaces of the optical elements each other in order to achieve miniaturization of an optical device, there may be caused a problem when bonding the light transmissive surfaces of the optical elements using such low-melting glass, an antireflection film formed on the optical elements may react with the low-melting glass during softening of the low-melting glass by heating, which may lead to lowering of antireflection function. For this reason, it has been considered that a practical application of the optical device obtained by using low-melting glass for bonding each light transmissive surface was difficult.

On the other hand, in the case of using solder, since solder has no transparency, it can not be disposed directly on each light transmissive surface Therefore, such a bonding method that each outer frame of light transmissive surfaces is selectively metalized to exist solder only on the metalized surface is employed. Such a bonding method suffers from a problem that a complicate metalizing process is required, and therefore, decrease in yield and increase in cost can not be avoided.

Moreover, a method that each optical element is directly bonded without using adhesive has been attempted. (See Japanese Patent Application Laid-open (kokai) No. 7-220923 and Japanese Patent Application Laid-Open Application (kokai) No. 2000-56265.) In these methods, after surfaces of optical elements are subjected to hydrophilic treatment, hydrophilic-treated surfaces are bonded each other. This method is practically used for a manufacturing process of an SOI (Silicon On Insulator) wafer in the semiconductor field. However, in the case of applying this method to an optical device, it suffers from problems as follows and therefore it is a difficult situation to put this method to practical use.

Namely, such a method wherein the optical elements are subjected to hydrophilic treatment and then bonded directly depends on a configuration and physical properties of the components to be bonded. For example, as for the warp, the curvature radius is desirably several hundreds meters or more. Moreover, it is said that surface roughness of components to be bonded is desirably Ra=0.3 nm or less. Furthermore, it is greatly influenced by difference in linear expansion coefficient of components to be bonded.

However, only few optical elements satisfy the above-mentioned requirements. For example, since an iron garnet crystal or the like which is one of optical elements generally used in the optical device has stress distribution in thickness direction, it often has large warp. Moreover, since a polarizing glass has the structure wherein metal particles such as silver, copper or the like are dispersed in glass, surface roughness thereof is hardly controlled. Furthermore, linear expansion coefficients of these optical elements often differ greatly depending on material, and thus there is a tendency that the difference in the linear expansion coefficient between components to be bonded becomes large. Therefore, the optical elements bonded directly as mentioned above are easily delaminated at the bonded surface when they are subjected to heat treatment, and adhesiveness and durability of the bonded surface are low.

Furthermore, there is a problem that when the materials of which linear expansion coefficient are different from each other are bonded directly as above, thermal stress is generated between different materials, and it is concentrated on the bonded surface, and thereby optical strain may easily generate, resulting in lowering of optical properties such as the extinction ratio. Therefore, it is very difficult to apply a direct bonding technique to an optical device.

As described above, it has been very difficult to bond optical elements without using organic adhesive, and to produce an optical device having high reliability easily at a low cost.

SUMMARY OF THE INVENTION

The present invention has been accomplished to solve the above-mentioned previous problems. An object of the present invention is to provide an optical device which has small size and has high reliability at a low cost by bonding optical elements each other without using organic adhesive.

To achieve the above mentioned object, the present invention provides a method for producing an optical device by bonding optical elements each other without using adhesive wherein the optical elements are bonded each other by using optical elements in which the relation between the linear expansion coefficient $\alpha 1$ and $\alpha 2$ (/° C.) of each of the optical elements to be bonded and the thickness t2 (m) of one of the optical elements satisfies the following formula; $|(\alpha 1-\alpha 2)\times t2|\leq 10^{-9}$ and $t2 \geq 2\times 10^{-5}$;

and/or, by sticking the optical elements each other in the state of being heated, and then subjecting them to a heat treatment.

According to the method of producing an optical device having such features, optical elements can be bonded with sufficient bonding strength without using adhesive. Moreover, since organic adhesive is not used, there is caused neither generation of outgas nor degradation of the bonded surface due to atmosphere. Therefore, a small size optical device having excellent optical properties and high reliability can be produced at a low cost.

Moreover, in order to accomplish the above object, according to the first embodiment of the present invention, there is provided an optical device formed by bonding a polarizer to at least one surface of a magnetic garnet crystal without using adhesive which functions by transmitting light through the bonded surface, wherein the relation of the linear expansion coefficient $\alpha1$ (/° C.) of the magnetic garnet crystal, the linear expansion coefficient $\alpha2$ (/° C.) of the polarizer and the thickness t2 (m) of the polarizer satisfies the following formula: $|(\alpha1-\alpha2) \times t2| \leq 10^{-9}$ and $t2 \geq 2 \times 10^{-5}$.

As described above, if the relation between the linear expansion coefficient $\alpha1$ (/° C.) of the magnetic garnet crystal, the linear expansion coefficient $\alpha2$ (/° C.) of the polarizer, and the thickness t2 (m) of the polarizer satisfies the following formula: $|(\alpha1-\alpha2) \times t2| \leq 10^{-9}$ and $t2 \geq 2 \times 10^{-5}$, delamination of the magnetic garnet crystal and the polarizer in heat treatment process for bonding can be prevented, and sufficient bonding strength can be achieved. Moreover, since the thermal stress generated between the magnetic garnet crystal and the polarizer can be reduced, degradation of the optical properties due to the optical strain originated from thermal stress can be suppressed. Furthermore, since organic adhesive is not used, there is neither generating of outgas nor degradation of a bonded surface due to it. Therefore, a small size optical device which has excellent optical properties and high reliability can be provided at a low cost.

In this case, a metal oxide film is preferably formed on the surface to be bonded to the polarizer of the above-mentioned magnetic garnet crystal. It is preferable that the metal oxide film consists of one kind or two or more kinds of metal oxide films selected from $Al_2O_3$, $TiO_2$ and $SiO_2$, and the metal oxide film has a structure laminated in a single-layer or a multilayer.

As described above, if the metal oxide film is formed on the surface to be bonded to the polarizer of the magnetic garnet crystal, it can act as an antireflection film and bonding to a polarizer can be stronger. Moreover, if the metal oxide film consists of one kind or two or more kinds of metal oxide films selected from $Al_2O_3$, $TiO_2$ and $SiO_2$, and it has a structure laminated in a single-layer or a multilayer, it is excellent as an antireflection film, and can achieve significant improvement in bonding strength. Thus, the optical device having high performance and high reliability can be obtained.

Moreover, the above-mentioned polarizer is a preferably a polarizing glass in that case.

One of the requirements of the present invention is to set up a thickness of a polarizer appropriately as described above. Therefore, it is required that the optical properties of a polarizer hardly depend on a thickness thereof. Therefore, it is preferable that a polarizer is a polarizing glass wherein optical properties are influenced little by a thickness. Thereby, the thickness of the polarizer can be set up appropriately, without degrading optical properties.

Furthermore, it is preferable that the above-mentioned magnetic garnet crystal is a bismuth-substituted iron garnet crystal.

As described above, if the magnetic garnet crystal is a bismuth-substituted iron garnet crystal which is excellent in Faraday-rotation ability, the Faraday-rotation angle of 45 degrees can be realized with a thickness of about 0.5 mm, and thus it is effective for miniaturization of an optical device.

Moreover, the above mentioned optical device can be an optical isolator.

The optical isolator is one of the most useful optical devices, and it is an indispensable device in optical communication. Thus, when the optical device of the present invention is an optical isolator, there can be provided an optical device which can meet miniaturization of an optical isolator and an organic adhesive free optical device strongly requested in recent years.

Then, a method for producing an optical device according to the first embodiment of the present invention is a method for producing an optical device by bonding a polarizer to at least one surface of a magnetic garnet crystal without using adhesive wherein the bonding is performed by using the magnetic garnet crystal and the polarizer in which the relation between the linear expansion coefficient $\alpha1$ (/° C.) of the magnetic garnet crystal, the linear expansion coefficient $\alpha2$ (/° C.) of the polarizer, and the thickness t2 (m) of a polarizer satisfies the following formula:

$$|(\alpha1-\alpha2) \times t2| \leq 10^{-9} \text{ and } t2 \geq 2 \times 10^{-5}.$$

As described above, if an optical device is produced by using the magnetic garnet crystal and the polarizer in which the relation between the linear expansion coefficient $\alpha1$ (/° C.) of the magnetic garnet crystal, the linear expansion coefficient $\alpha2$ (/° C.) of the polarizer, and the thickness t2 (m) of the polarizer satisfies the following formula: $|(\alpha1-\alpha2) \times t2| \leq 10^{-9}$ and $t2 \geq 2 \times 10^{-5}$, the magnetic garnet crystal and the polarizer can be bonded with sufficient bonding strength without using adhesive, and degradation of the optical properties by the optical strain in a bonded body can be suppressed. Therefore, the optical device with high reliability having excellent optical properties can be manufactured at a low cost.

In this case, the above-mentioned magnetic garnet crystal and the above-mentioned polarizer are bonded preferably by subjecting each of the bonded surfaces to polishing, cleaning, hydrophilic treatment and drying processes, and then sticking the bonded surfaces directly or through solution, followed by subjecting them to heat treatment.

As described above, if each of the bonded surfaces of the magnetic garnet crystal and the polarizer is subjected to polishing, cleaning, hydrophilic treatment and drying processes, and then they are stuck directly or through solution, and subjected to heat treatment, chemical species which constitute the magnetic garnet crystal and chemical species which constitute the polarizer can interact effectively, and sufficient bonding strength can be achieved. Thereby, delamination of a bonded surface can be prevented.

In this case, it is still more preferable that as the above-mentioned solution used when the magnetic garnet crystal and the polarizer are bonded, solution containing as a main component polar molecules is used independently or by mixture.

As described above, if the solution containing as a main component polar molecules is used independently or by mixture when the magnetic garnet crystal and the polarizer are bonded, bonding strength between the magnetic garnet crystal and the polarizer can be further improved.

Moreover, it is preferable that the magnetic garnet crystal and the polarizer are bonded after forming a metal oxide film on the bonded surface of the magnetic garnet crystal which is to be bonded to the polarizer.

As described above, by bonding them after forming a metal oxide film on the surface of the magnetic garnet crystal which is to be bonded to the polarizer, the bonding strength can be further improved. Moreover, since the formed metal oxide film functions as an antireflection film in an optical device, an optical device which is highly reliable and highly efficient can be manufactured.

Furthermore, it is preferable that the metal oxide film formed on the magnetic garnet crystal consists of one kind or two or more kinds of metal oxide films selected from $Al_2O_3$, $TiO_2$ and $SiO_2$, and the metal oxide film is laminated in a single-layer or a multilayer.

As described above, if the metal oxide film consists of one kind or two or more kinds of metal oxide films selected from $Al_2O_3$, $TiO_2$ and $SiO_2$, and it is laminated in a single-layer or a multilayer, the function of a metal oxide film as an antireflection film can be improved further, and the bonding strength of the magnetic garnet crystal and the polarizer can also be increased remarkably.

Moreover, according to the present invention, an optical isolator can be manufactured by bonding the polarizer to the magnetic garnet crystal.

If an optical isolator is manufactured as described above, a small size optical isolator which has sufficient bonding strength can be manufactured without using adhesive.

Furthermore, in order to achieve the above-mentioned purpose, according to the second embodiment of the present invention, there is provided a method for producing an optical device by bonding optical elements each other without using adhesive in which the optical elements are bonded by at least subjecting the bonded surface of each of the optical elements to polishing, cleaning, and hydrophilic treatment, and then sticking the bonded surfaces of the optical elements each other, followed by subjecting them to heat treatment, wherein the optical elements are stuck each other in a state of being heated, and then subjected to the heat treatment.

As described above, if the optical elements are heated and then the heated optical element are stuck each other, the difference between the temperature of the optical elements when being stuck and the temperature thereof at the heat treatment can be made small. And thereby, thermal stress generated on the bonded surface due to temperature change at the heat treatment can be made small, so that delamination of the bonded surface resulting from the thermal stress can be prevented, and the optical device bonded with sufficient bonding strength can be manufactured. Moreover, it becomes possible to bond the optical elements, even if the flatness and the surface roughness of the optical elements are not fully controlled. Moreover, since they are bonded without using organic adhesive, there is no generation of outgas. Furthermore, since bonding state of the optical device bonded as described above is excellent, the forward direction insertion loss is also low, and it has excellent optical properties. Therefore, an optical device which is small size, reliable and highly efficient can be manufactured at a low cost.

In that case, it is preferable to stick the optical elements each other with heating the optical elements so that temperature of the optical elements may be 40° C. or more and 100° C. or less.

If the optical elements are bonded each other with heating so that the temperature of the optical elements may be 40° C. or more as described above, thermal stress generated due to the temperature change at the heat treatment can be made smaller, and delamination of the bonded surface due to thermal stress can be prevented effectively. Moreover, if the temperature of the optical elements is 100° C. or less, the optical elements can be stuck easily, without generation of problems on work.

In that case, it is preferable to keep the temperature of the optical elements at 40° C. or more after sticking the optical elements until they are subjected to the heat treatment.

If the temperature of the optical elements is kept at 40° C. or more after the optical elements are stuck until they are subjected to the heat treatment as described above, thermal stress generated due to lowering of the temperature of the optical element from sticking the optical elements each other to subjecting them to the heat treatment can be reduced, and delamination of the bonded surface of the bonded body stuck will weak bonding strength can be prevented. Moreover, by subjecting the bonded body to the heat treatment thereafter, bonding strength of the bonded surface can be increased further, and the optical device bonded with sufficient bonding strength and a excellent bonding state can be manufactured.

Moreover, in that case, it is preferable to stick the bonded surfaces directly or through solution when the above-mentioned optical elements are stuck at the bonded surface.

If the optical elements are bonded at the bonded surface each other directly or through solution as described above, the chemical species which constitute each of the optical elements can interact effectively, and the optical elements are bonded each other with high bonding strength.

Moreover, in case that the above-mentioned optical elements are stuck each other through solution, as the solution it is preferable to use liquid containing polar molecules as a main component independently or by mixture.

If the liquid containing polar molecules as a main component is used independently or by mixture when the optical elements are stuck through the solution as described above, bonding strength to the optical elements can be increased further and delamination which generated in the bonded surface can be effectively prevented.

Moreover, in the heat treatment process after sticking the above-mentioned optical elements each other on the bonded surface, the heat treatment temperature is preferably 100° C. or more and 400° C. or less.

If the heat treatment temperature of the heat treatment process is 100° C. or more and 400° C. or less as described above, the bonding strength of the optical elements can be increased effectively, and the optical device bonded with sufficient bonding strength and having an excellent bonding state can be manufactured.

In case that the above-mentioned heat treatment is performed, a rate of increasing temperature is preferably 20° C./hr or less.

If the rate of increasing temperature is 20° C./hr or less as described above, large thermal stress is not rapidly generated on the bonded surface when performing the heat treatment. Therefore, delamination of the bonded surface can be reduced and variation in bonding strength at the bonded surface call be further made small. Therefore, there can be obtained the optical device in which optical elements are bonded each other in a good state, Furthermore, it is preferable that the above-mentioned heat treatment is performed in the low temperature atmosphere or in the atmosphere containing hydrogen.

If the heat treatment atmosphere is the low pressure atmosphere or the atmosphere containing hydrogen as described above, bonding strength of the bonded surface can be further increased.

In that case, the optical elements to be bonded can be at least a magnetic garnet crystal and a polarizer.

If the optical elements are tit least a magnetic garnet crystal and a polarizer as described above, the resultant optical device can be the optical device which functions as an optical isolator. The optical isolator is one of those having the highest utility value among optical devices, and it is an indispensable device in optical communication. Therefore, according to the present invention, the optical isolator which is small size and has sufficient bonding strength can be provided.

Furthermore, in that case, it is preferable that a metal oxide film is previously formed on the bonded surface of at least one of the optical elements before sticking the optical elements each other, and then the optical elements are stick each other.

If the metal oxide film is formed on the bonded surface of at least one of the optical elements to be bonded, for example, in the case that a magnetic garnet crystal and a polarizer are bonded, on the bonded surface of the magnetic garnet crystal which is to be bonded to the polarizer, and then they are stuck together, the bonding strength of a bonded surface can be further increased. Moreover, since the formed metal oxide film functions as an antireflection film in the optical device, a reliable and highly efficient optical device can be manufactured.

In that case, it is preferable that the metal oxide film formed on the bonded surface of the optical element consists of one kind or two or more kinds of metal oxide films selected from $Al_2O_3$, $TiO_2$ and $SiO_2$, and the metal oxide film is laminated in a single-layer or a multilayer.

If the metal oxide film to be formed consists of one kind or two or more kinds of metal oxide films selected from $Al_2O_3$, $TiO_2$ and $SiO_2$, and it is laminated in a single-layer or a multilayer as described above, the function as an antireflection film of the metal oxide film can be enhanced further, and the bonding strength of the optical elements can also be increased remarkably.

The optical device manufactured by the production method according to the second embodiment or the present invention is formed by bonding the optical elements each other with sufficient bonding strength without using organic adhesive. Thus, outgas is not generated, and degradation of a bonded surface is not caused. Furthermore, since the bonding state of a bonded surface is also excellent, the forward direction insertion loss of the optical device can be reduced. Therefore, there can be obtained an optical device which is small size, and has high reliability and high performance.

Moreover, the optical device produced by the production method according to the second embodiment of the present invention can be, for example, an optical isolator.

As described above, the optical isolator is one of the optical devices which has the most valuable utility. Accordingly, when the optical device of the present invention is an optical isolator, there can be provided an optical device which can meet miniaturization of an optical isolator and an organic adhesive free optical device strongly requested in recent years. Furthermore, since it has sufficient bonding strength and the bonding state thereof is also excellent, there can be provided a highly reliable and highly efficient optical isolator.

As explained above, according to the present invention, optical elements can be easily bonded each other with strong bonding strength without using adhesive. Furthermore, there can be provided a small size and highly reliable optical device having excellent optical properties at a low cost in which there is neither generation of outgas nor degradation of the bonded surface.

BEST MODE FOR CARRYING OUT THE INVENTION

The embodiments of the present invention will be further described below, but the present invention is not limited thereto.

The inventors of the present invention have found that, by the method for producing an optical device wherein optical element are bonded each other on a light transmissive surface without using adhesive as shown below, there can be produced a small size and highly reliable optical device in which bonding is achieved with sufficient bonding strength to suppress delamination of a bonded surface, and lowering of optical properties is suppressed even when the optical elements to be bonded have different linear expansion coefficients, and thereby completed the present invention.

Namely, according to the present invention, there can be provided a method for producing an optical device by bonding optical elements each other without using adhesive wherein the optical elements are bonded each other by using an optical elements in which the relation between linear expansion coefficients $\alpha 1$ and $\alpha 2$ ($/°$ C.) of each of the optical elements to be bonded and thickness t2 (m) of one of the optical elements satisfies the following formula: $|(\alpha 1 - \alpha 2) \times t2| \leq 10^{-9}$ and $t2 \geq 2 \times 10^{-5}$;

and/or, by sticking the optical elements each other in the state of being heated, and then subjecting them to heat treatment.

First, in the first embodiment of the present invention, in order to provide a small size and highly reliable optical device, the inventors of the present invention have found that an optical device wherein a magnetic garnet crystal is bonded to a polarizer, and the linear expansion coefficient of a magnetic garnet crystal, the, linear expansion coefficient of a polarizer and the thickness of a polarizer are selected appropriately is quite effective as an optical device in which optical elements are bonded each other at the light transmissive surface with sufficient bonding strength without using organic adhesive, no damage is given to antireflection films of various optical elements in bonding, and moreover lowering of optical properties is prevented even when the optical elements having different linear expansion coefficients are bonded. And, the inventors, have studied various conditions for bonding further, and thereby have completed the present invention.

Namely, if it is an optical device formed by bonding a polarizer to at least one surface of a magnetic garnet crystal without using adhesive which functions by transmitting light through the bonded surface, wherein the relation of the linear expansion coefficient $\alpha 1$ (/° C.) of the magnetic garnet crystal, the linear expansion coefficient $\alpha 2$ (/° C.) of the polarizer and the thickness t2 (m) of the polarizer satisfies the following formula: $|(\alpha 1 - \alpha 2) \times t2| \leq 10^{-9}$ and $t2 \geq 2 \times 10^{-5}$, there can be provided a small size and highly reliable optical device having sufficient bonding strength and excellent optical properties at a low cost.

Figure 1:
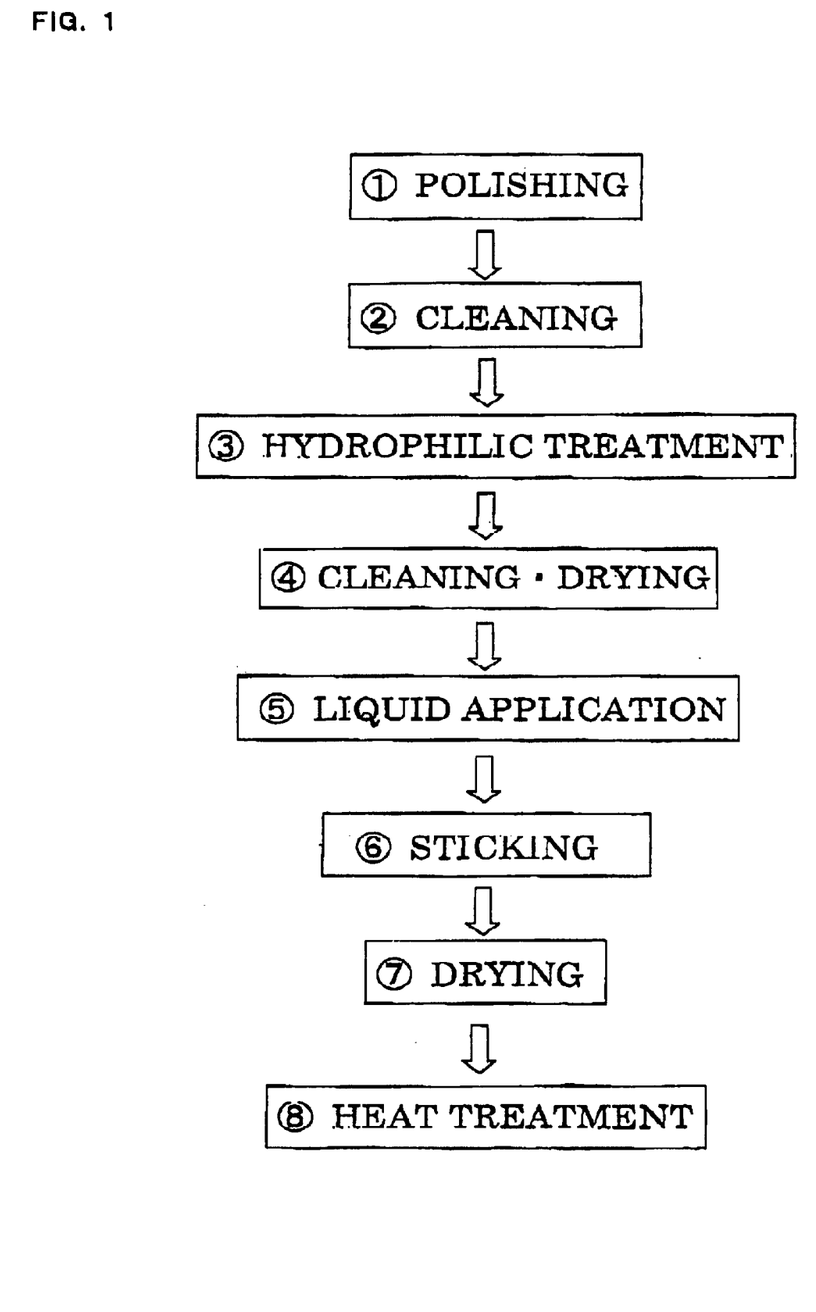
FIG. 1 is a flow diagram showing an example of the method for bonding according to the first embodiment of the present invention.

One example of the method for bonding a magnetic garnet crystal and a polarizer according to the first embodiment of the present invention is shown in FIG. 1.

First, surfaces to be bonded (bonded surfaces) of a magnetic garnet crystal and a polarizer are sufficiently subjected to polishing (step (1)). Then, each bonded surface is fully subjected to cleaning (step (2)), and subjected to hydrophilic treatment (step (3)). At that time, although common wet cleaning is effective for cleaning (2) of the bonded surface, it is more effective to conduct in combination with ultraviolet ray radiation process (UV process) or plasma process. Also, it is effective for the hydrophilic treatment (3) to use mixed solution of ammonia water, hydrogen peroxide solution and pure water, which is generally used for a semiconductor SOI wafer process, a diluted solution of nitric acid or hydrochloric acid, or a solution made by adding hydrogen peroxide solution to these diluted solution.

Next, cleaning with pure water is performed to remove the hydrophilic treatment solution. It is preferable to dry the optical elements by IPA vapor drying method or a spin dryer after cleaning with pure water, to prevent unevenness of drying (step (4)).

Subsequently, the magnetic garnet crystal and the polarizer after pro-treatment obtained by the above method are stuck each other. Although it may be bonded directly at the bonded surface in that case, it is preferable in order to bond them more easily to apply solution to a bonded surface (step (5)), and then to stick the magnetic garnet crystal and the polarizer (step (6)). It is preferable to use, an the solution applied at this time, liquid which contains polar molecules such as water, ammonia or the like as a main component by itself or by mixture, especially it is preferable to stick them through pure water. The bonding strength of the magnetic garnet crystal and the polarizer can be increased, if they are bonded using such solution. Moreover, it is also possible to adding a soluble material such as alkali metals, silicate or the like to this solution, to increase a bonding strength further.

The bonded body stuck by the above-mentioned procedure is fixed with weak bonding strength by performing natural drying or vacuum drying (step 7)).

After drying, the obtained bonded body is subjected to heat treatment at a temperature of about 100–400° C. for several hours to achieve sufficient bonding strength (step (8)). In this case, if a rate of increasing temperature in the heat treatment process in too high, delamination of the bonded surface may occur during increasing temperature. Therefore, the rate of increasing temperature is preferably 20° C./h or less. Also, although the atmosphere during the heat treatment may be the air, it is more preferable that it is a low pressure atmosphere or an atmosphere containing hydrogen.

However, even when optical elements are bonded each other directly by the above-method for bonding, delamination may occur in the bonded surface due to generation of thermal stress or the like in the heat treatment of step (8).

Then, the inventors of the present invention have noted to the linear expansion coefficient $\alpha 1$ (/° C.) of the magnetic garnet crystal which constitutes an optical device, the linear expansion coefficient $\alpha 2$ (/° C.) and the thickness t2 (m) of the polarizer which constitutes an optical device, and have made experiments actually with changing the conditions variously, to find the condition in which delamination of the bonded surface can be suppressed. Namely, they confirmed that when the optical device is obtained by using the magnetic garnet crystal and the polarizer in which the relation between the above $\alpha 1$, $\alpha 2$ and t2 satisfies the following formula:
$|(\alpha 1 - \alpha 2) \times t2| \leq 10^{-9}$ and $t2 \geq 2 \times 10^{-5}$, delamination of the bonded surface could be extremely reduced in the optical device.

In the above-mentioned process for bonding, when a magnetic garnet crystal and a polarizer are bonded, it is preferable to form previously on the bonded surface of the optical element an antireflection coating optimized to the refractive index of an optical element facing thereto.

For example, when the magnetic garnet crystal and the polarizer are bonded in the above-mentioned method for bonding directly, if a metal oxide film is formed on the bonded surface of the magnetic garnet crystal which is to be bonded to the polarizer, and the magnetic garnet crystal and the polarizer are stuck after that, the formed metal oxide film functions as an antireflection film. Furthermore, the bonding strength of the magnetic garnet crystal and the polarizer can be increased by forming the metal oxide film in this way.

In this case, the metal oxide film formed on the bonded surface of the magnetic garnet crystal can be chemically stable, and be transparent in a communication wavelength band (0.9–1.7 $\mu$m), and it is still more preferable if the surface layer thereof is easily subjected to hydrophilic treatment. Therefore, if the metal oxide films are one kind or two or more kinds of metal oxide films chosen from $Al_2O_3$, $TiO_2$ and $SiO_2$, and it is laminated in a single-layer or a multilayer, a large effect as an antireflection film can be obtained, and bonding strength can be significantly improved. Thereby, the optical device with high reliability can be obtained.

Figure 2:
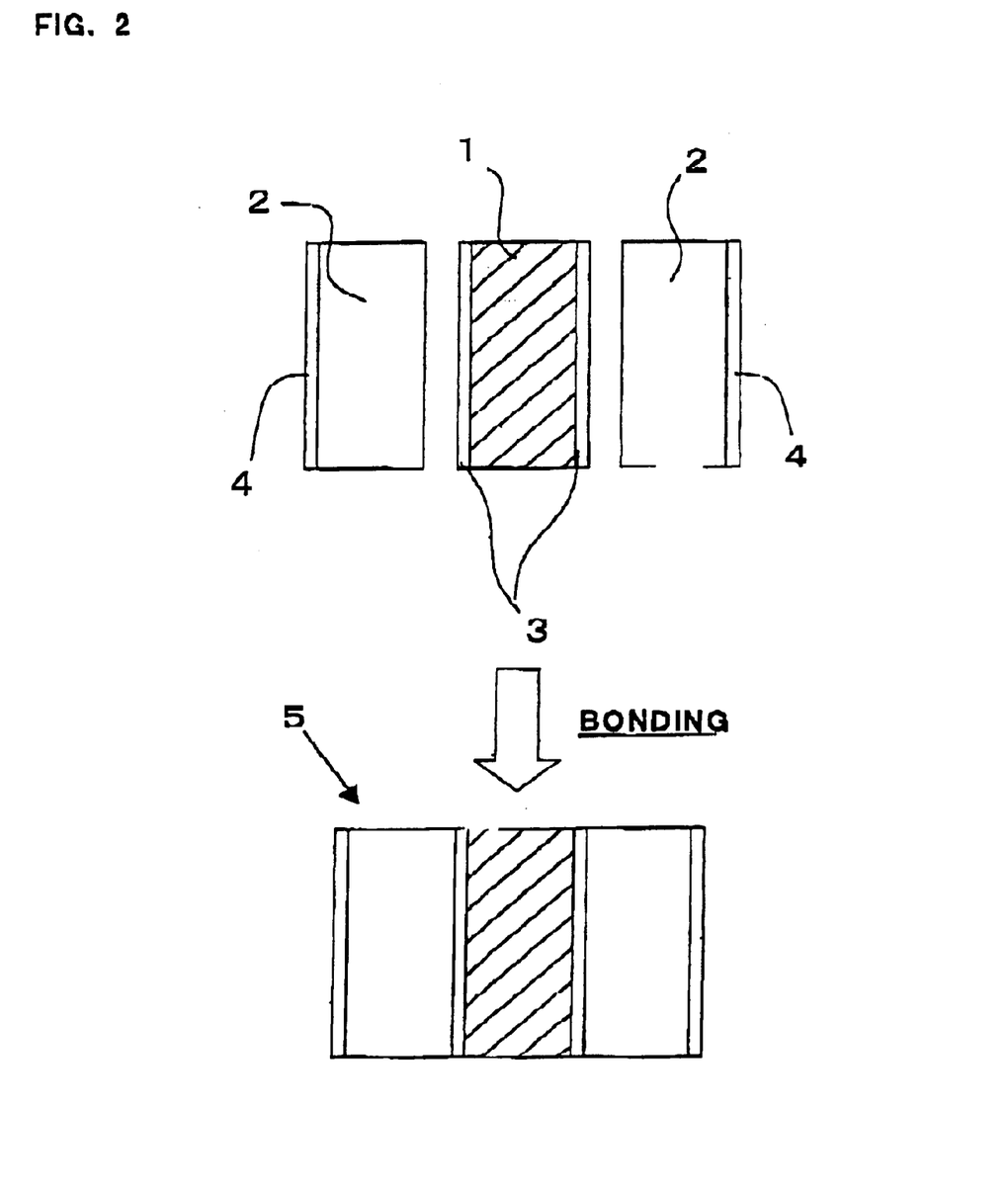
FIG. 2 is a schematic view showing an example of the constitution of the optical device in the first embodiment of the present invention.

As described above, the optical device in 5 which functions as an optical isolator, in which the polarizers 2 are directly bonded to both sides of the magnetic garnet crystal 1 as shown in FIG. 2 can be obtained. FIG. 2 shows one example of the optical device in which the metal oxide film 3 which acts as an antireflection film for a glass is formed on the magnetic garnet crystal 1, and an antireflection film 4 for air was formed on the polarizer 2. However, the present invention is not limited thereto. Namely, in the optical device of the present invention, an antireflection film is not necessarily formed on a magnetic garnet crystal or a polarizer. Moreover, formation of the antireflection film 4 of the polarizer can be conducted in any time between the above-mentioned bonding processed.

Generally, in the optical device which is easily affected by strain of optical elements, for example, in an optical isolator or the like, when bonded optical elements suffer from stress, the extinction ratio tends to be decreased.

Furthermore, in the optical device in which optical elements are bonded without using adhesive in order to miniaturize an optical device, since optical elements are fixed firmly, the stress (thermal stress) proportional to the difference of linear expansion coefficient between optical elements is generated in accordance with the temperature change of the optical device.

Therefore, in the optical device bonded directly without using adhesive in this way, the extinction ratio will be degraded with temperature change. The degradation of the extinction ratio with the temperature change tends to become remarkable when the difference of linear expansion coefficient between the optical elements is $2 \times 10^{-6}/°$ C. or more. Generally the linear expansion coefficient of the polarizing glass used as a polarizer is $6.5 \times 10^{-6}/°$ C., and the linear expansion coefficient of the bismuth-substituted iron garnet crystal used as a magnetic garnet crystal is $11 \times 10^{-6}/°$ C. Therefore, the difference in both linear expansion coefficients will become $4.5 \times 10^{-6}/°$ C., and in the case of the optical device obtained by bonding the bismuth-substituted iron garnet crystal and the polarizing glass directly, a large degradation of the extinction ratio may be caused.

According to the present invention, even if the difference of linear expansion coefficient between a magnetic garnet crystal and a polarizer is large, the degradation of the extinction ratio is prevented by optimizing the thickness of a polarizer depending on the difference of the linear expansion coefficient between a magnetic garnet crystal and a polarizer.

Degradation of the extinction ratio is suppressed more with thinner thickness of a polarizer, and it is suppressed more with smaller difference of linear expansion coefficient between a polarizer and a magnetic garnet crystal. Because, when the thickness of a magnetic garnet crystal is constant, the thermal stress generated between a polarizer and a magnetic garnet crystal is proportional to the thickness of a polarizer. If the thickness of a polarizer is thick, the strain in a bonded surface will become large, and the extinction ratio will be degraded. Moreover, where the difference between linear expansion coefficients is large, thermal stress also becomes large, and degradation of the extinction ratio becomes large.

The above-mentioned relation will be described concretely below. If the difference between the linear expansion coefficient ($\alpha 1$) of a magnetic garnet crystal and the coefficient of thermal expansion of a polarizer ($\alpha 2$) is represented by $|(\alpha 1 - \alpha 2)|$ and the thickness of a polarizer is represented by t2, degradation of an extinction ratio can be suppressed when the product of $|(\alpha 1 - \alpha 2)|$ by t2 is less than a certain value.

Then, experiments and investigation were conducted about the relation of the linear expansion coefficient difference between a polarizer and a magnetic garnet crystal and the thickness of a polarizer, that is $|(\alpha 1 - \alpha 2) \times t2|$, and it was found that it is sufficient to satisfy the following conditions.

That is, if it is the optical device wherein the relation of the above $\alpha 1$, $\alpha 2$, and t2 satisfies the formula: $|(\alpha 1 - \alpha 2) \times t2| \leq 10^{-9}$, degradation of the extinction ratio due to strain originated from the thermal stress is reduced, and it can be the optical device which has excellent optical properties. Furthermore, the polarizer needs to have the thickness of $2 \times 10^{-5}$ m or more in order to obtain a sufficient extinction characteristic of the polarizer itself. Therefore, it is necessary to also satisfy simultaneously the condition of the thickness or a polarizer: $t2 \geq 2 \times 10^{-5}$.

Moreover, as mentioned above, the present invention achieves improvement of bonding strength of an optical device and optical properties by setting up the thickness of a polarizer appropriately as one of the requirements to prevent delamination on the bonded surface and reduce thermal stress. Accordingly, it is required that the optical properties of a polarizer hardly depend on the thickness thereof. Therefore, it is preferable that the polarizer is a polarizing glass having little influence of the thickness to optical properties. Thereby, the thickness of a polarizer can be set up appropriately without reducing optical properties. As the polarizing glass, there can be used materials in which metal particles such as silver or copper are dispersed in glass matrix, such as a borosilicate glass currently generally used.

Furthermore, a magnetic garnet crystal is preferably a bismuth-substituted iron garnet crystal excellent in Faraday-rotation ability. Thereby the Faraday-rotation angle of 45 degrees can be realized by the thickness of about 0.5 mm, and thus it is effective in miniaturization of an optical device.

In the second embodiment of the present invention, the inventors of the present invention have found in order to provide a method of manufacturing a small size and highly reliable optical device, as a method in which optical elements are bonded at the light transmissive surface without using organic adhesive, there is no damage given to the antireflection film of various optical elements at the time of bonding, and sufficient bonding strength can be obtained even in the optical element that causes easily warp and roughen surface, a method wherein the optical elements are stuck in a state of high temperature and a heat treatment is conducted to bond and integrate them, and thereby it is possible to suppress delamination of a bonded surface and to bond optical elements each other with sufficient bonding strength without using adhesive. And the inventors have studied the various conditions as for bonding, to complete the present invention.

Namely, the method for producing an optical device according to the second embodiment of the present invention is a method for producing an optical device by bonding optical elements each other without using adhesive in which the optical elements are bonded by at least subjecting the bonded surface of each of the optical elements to polishing, cleaning, and hydrophilic treatment, and then sticking the bonded surfaces of the optical elements each other, followed by subjecting them to heat treatment, wherein the optical elements are stuck each other in a state of being heated, and then subjected to the heat treatment.

Since difference between the temperature at the time of sticking optical elements and the heat treatment temperature during the heat treatment can be reduced and thereby thermal stress generated in a bonded surface during the heat treatment can be made small according to such a method for producing an optical device of the present invention. Therefore, delamination generated in a bonded surface during the heat treatment can be reduced, and the optical device bonded with sufficient bonding strength can be manufactured. Namely, it is necessary to carry out the heat treatment at 100° C. or more finally, in order to bond optical elements so firmly that it can be used. Therefore, the larger difference between the heat treatment temperature and the temperature during sticking the optical elements causes the larger thermal stress generated at the time of heat treatment to the time of sticking, and it is considered that delamination is easily caused when the temperature is increased or decreased in the heat treatment or during the heat treatment.

According to the present invention, it becomes possible to bond optical elements, even if they are optical elements of which the flatness or the surface roughness are not fully controlled. Furthermore, since organic adhesive is not used, there is no generation of outgas, and it does not have a bad influence on other optical parts. Furthermore, in the optical device produced in this way, a bonding state is good, and degradation of a bonded surface is also reduced. Therefore, the degradation of the optical properties of an optical device can also be suppressed. Accordingly, there can be produced the optical device which is small size, highly reliable and highly efficient at a low cost.

Figure 6:
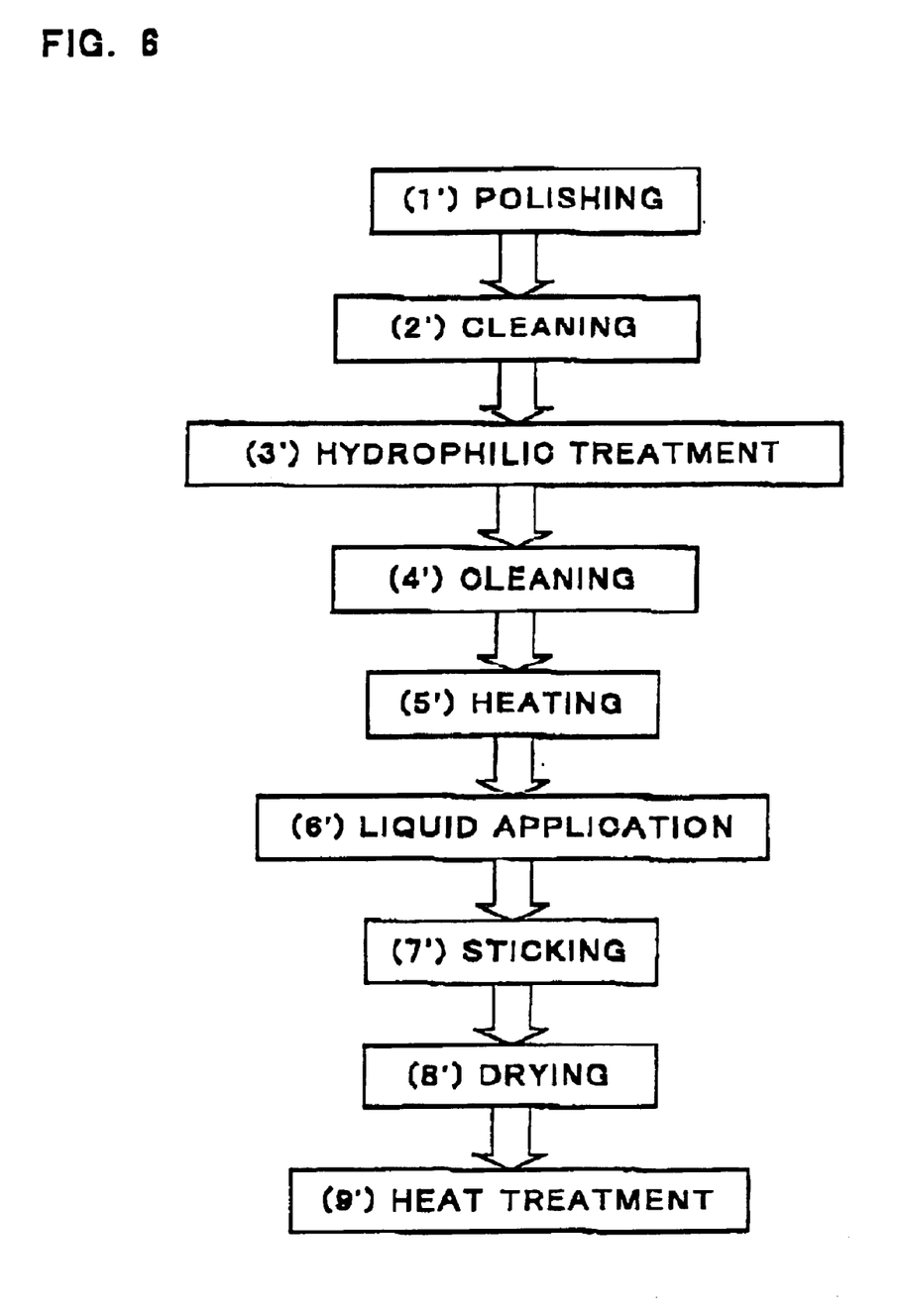
FIG. 6 is a flow diagram showing an example of the method for bonding according to the second embodiment of the present invention.

The method for bonding optical elements each other according to the second embodiment will be hereunder explained with referring to FIG. 6, as for the case that an optical device is produced using a magnetic garnet crystal and a polarizer as optical elements, mentioned as an example.

First, surfaces to be bonded (bonded surfaces) of a magnetic garnet crystal and a polarizer are sufficiently subjected to polishing (step (1')). Then, each bonded surface is fully subjected to cleaning (step (2')), and subjected to hydrophilic treatment (step (3')). At that time, although common wet cleaning is effective for cleaning (2') of the bonded surface, it is more effective to conduct in combination with UV process or plasma process. Also, it is effective for the hydrophilic treatment (3') to use mixed solution of ammonia water, hydrogen peroxide solution and pure water, which is generally used for a semiconductor SOI wafer process, a diluted solution of nitric acid or hydrochloric acid, or a solution made by adding hydrogen peroxide solution to these diluted solution.

Next, cleaning with pure water is performed to remove the hydrophilic treatment solution (step (4')). The bonded surface may be dried by IPA vapor drying method, a spin dryer or the like if necessary, after the cleaning with pure water. In the case of drying the bonded surface as described above, it is preferable to prevent unevenness of drying.

Subsequently, the magnetic garnet crystal and the polarizer after pre-treatment obtained by the above steps are heated (step (5')), and stuck each other with keeping the heated state. Although it may be bonded directly at the bonded surface in that case, it is preferable in order to bond more easily to apply solution to a bonded surface (step (6')) and then stick the magnetic garnet crystal and the polarizer (step (7')).

It is preferable to use, as the solution applied at this time, liquid which contains polar molecules such as water, ammonia or the like as a main component independently or by mixture, and it is especially preferable to stick them through pure water. Strong hydrogen bond is obtained by bonding using pure water as above, and thus bonding strength of the magnetic garnet crystal and the polarizer can be further increased. Moreover, it is also possible to add a soluble material such as alkali metals and silicate to this solution, to increase the bonding strength further.

When the optical elements are heated and they are stuck, it is preferable to stick the optical elements after heating the optical elements at a temperature of 40° C. or more and 100° C. or less if the temperature of the optical element is lower than 40° C. when the optical elements are stuck, the thermal stress generated in a bonded surface during the heat treatment becomes larger, and delamination may be caused. If the temperature of the optical element is higher than 100° C., there may be easily caused a problem relating to handling because of high temperature when the optical elements are stuck each other. Furthermore, it may be difficult to appropriately bond the optical elements each other in the case that the optical elements are stuck each other through a solution, especially pure water, since the pure water applied to the bonded surface will evaporate. Accordingly, heating of the optical elements (5') and application of liquid to the bonded surface (6)' can be conducted at the same time by immersing the optical elements into the heated pure water.

The bonded body stuck by the above manner is fixed with weak bonding strength by performing natural drying or vacuum drying (step (8')).

After drying, the bonded body fixed with weak bonding strength is subjected to the heat treatment for several hours at heat treatment temperature of 100° C. or more and 400° C. or less, to increase the bonding strength of the bonded body, and thereby the optical device bonded with sufficient bonding strength can be produced (step (9)'). At this time, sufficient bonding strength for the grade which is satisfactory as a product can be obtained by the heat treatment temperature of 100° C. or more. On the other hand, when the heat treatment temperature exceeded 400° C., optical properties may be degraded, especially in the case that a polarizing glass or the like is used as an optical element.

Moreover, at this time, if a rate of increasing temperature in the heat treatment process is too high, delamination of a bonded surface may occur during heating. Accordingly, a rate of increasing temperature is preferably 20° C./h or lower. Moreover, although the atmosphere during the heat treatment may be the air, it is more preferable that it is the low pressure atmosphere or the atmosphere containing hydrogen. By performing the heat treatment in such an atmosphere, bonding strength of a bonded surface can be increased further.

Moreover, since the bonded body obtained by heating optical elements and then sticking them in the above-mentioned process for bonding has the weak bonding strength, it is easily affected by thermal stress due to the temperature change and delamination is apt to be generated in the bonded surface. Therefore, it is preferable to keep a temperature of the optical elements at 40° C. or more until the heat treatment is performed after sticking optical elements (step (7)').

By keeping the temperature of the optical elements at 40° C. or more until the bonded body is subjected to the heat treatment as described above, thermal stress generated in the bonded surface adhered with weak bonding strength due to lowering of the temperature of the optical elements until they are subjected to the heat treatment can be made small, and thus generation of delamination can be reduced Accordingly, by subjecting the bonded body adhered with an excellent bonding state to the heat treatment thereafter to improve bonding strength further, the optical device bonded with sufficient bonding strength and with the more excellent bonding state can be manufactured.

In addition, in the above-mentioned process for bonding, it is preferable to give previously an antireflection coating optimized to the refractive index of an opposite optical element on the bonded surface of the optical element, when optical elements are bonded.

For example, when the magnetic garnet crystal is bonded to the polarizer in the above-mentioned method for bonding directly, if metal oxide film is formed on the bonded surface of the magnetic garnet crystal which is to be bonded to the polarizer and the magnetic garnet crystal and the polarizer are stuck after that, the formed metal oxide film acts as an antireflection film. Furthermore, the bonding of the magnetic garnet crystal and the polarizer can be become firmer by forming a metal oxide film in this way.

The metal oxide film formed on the bonded surface of the optical element in that case can be chemically stable, and be transparent in a communication wavelength band (0.9–1.7

μm), and it is still more preferable if the surface layer thereof is easily subjected to hydrophilic treatment. Therefore, if the metal oxide films are one kind or two or more kinds of metal oxide films selected from $Al_2O_3$, $TiO_2$ and $SiO_2$, and it is laminated in a single-layer or a multilayer, it functions an antireflection film effectively, and bonding strength can be significantly improved. Thereby, the optical device with high reliability can be obtained.

Figure 7:
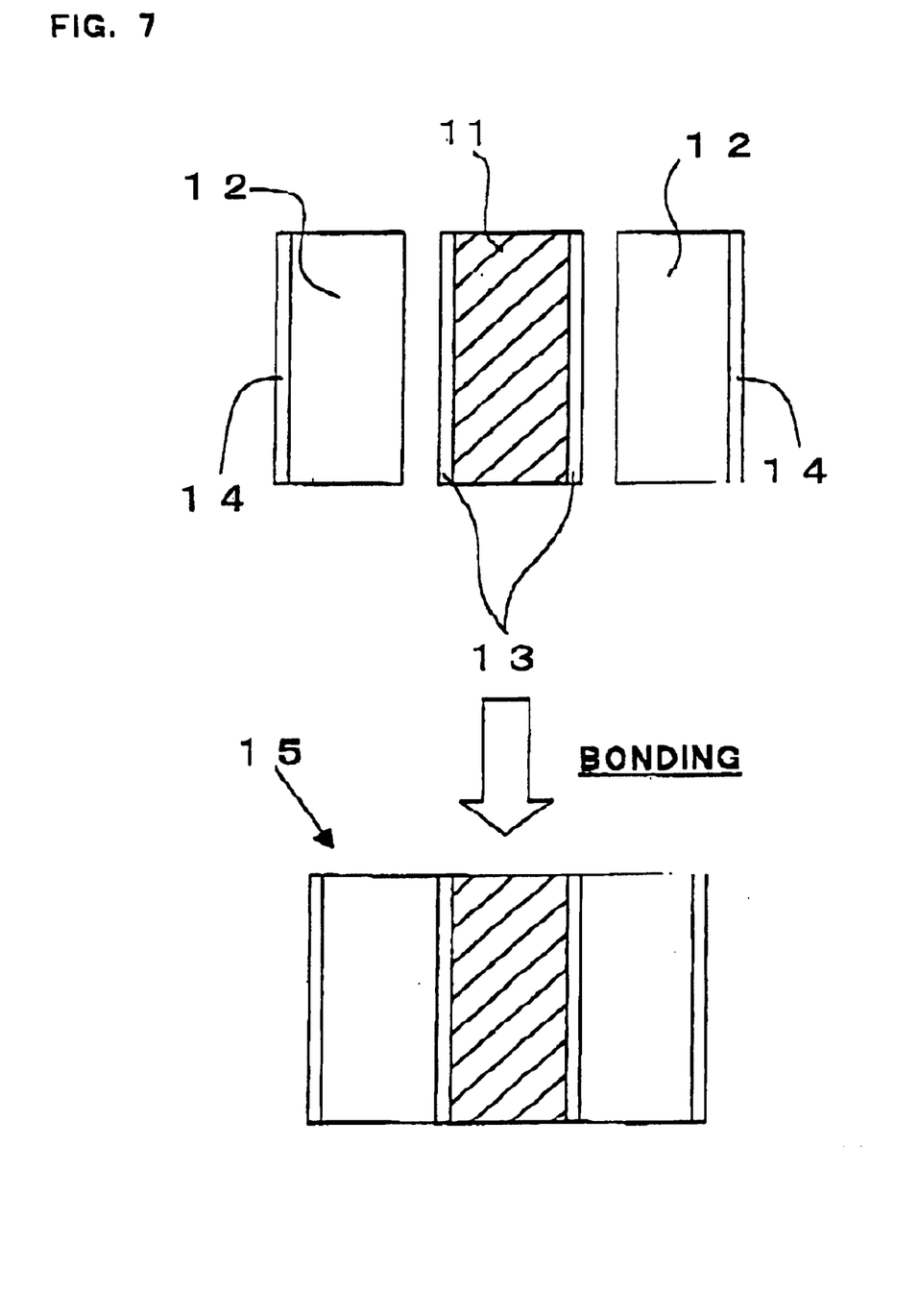
FIG. 7 is a schematic view showing an example of the constitution of the optical device in the second embodiment of the present invention.

As described above, according to the present invention, the optical device 15 which functions as an optical isolator, in which the polarizers 12 are directly bonded to both sides of the magnetic garnet crystal 11 as shown in FIG. 7 can be obtained. FIG. 7 shows one example of the optical device in which the metal oxide film 13 which acts as an antireflection film for a glass is formed on the magnetic garnet crystal 1, and the antireflection film 14 for air was formed on the polarizer 12, as described above.

When a polarizer is used as an optical element as described above, it is preferable that the polarizer is a polarizing glass which has a sufficient extinction performance even if it is comparatively thin. The optical device can be further miniaturized by using such a polarizing glass. As the polarizing glass, there can be used materials in which metal particles such as silver or copper are dispersed in glass matrix such as a borosilicate glass generally used. Furthermore, the magnetic garnet crystal is preferably a bismuth-substituted iron garnet crystal excellent in Faraday-rotation ability. According to such a magnetic garnet crystal, the Faraday-rotation angle of 45 degrees can be realized by the thickness of about 0.5 mm, and thus it is more effective in miniaturization of an optical device.

However, the present invention is not limited thereto. For example, there can be used as an optical element applied to the present invention not only the above-mentioned polarizer and a magnetic optical element such as a magnetic garnet crystal but an electric optical element, a wavelength-selection filter, a waveplate, or a piezoelectric device. Even when such optical elements are bonded, optical elements can be bonded each other with sufficient bonding strength according to the present invention.

Moreover, in the optical device of the present invention, an antireflection film is not necessarily formed on a magnetic garnet crystal or a polarizer. Moreover, formation of the antireflection film 14 of the polarizer can be conducted in any time between the above-mentioned bonding processes.

In the optical device produced as described above, the optical elements are bonded each other with sufficient bonding strength. Furthermore, since they are bonded without using an organic adhesive, outgas is not generated. Furthermore, since the bonding state of a bonded surface is excellent, the forward direction insertion loss of an optical device can be reduced. Therefore, there can be obtained an optical device which has excellent optical properties.

EXAMPLE

Although the present invention will be explained concretely hereafter by Examples and Comparative examples of the present invention, the present invention is not limited thereto.

Example 1

As for optical elements used for bonding, several kinds of polarizing glasses that differ in thickness were prepared as a polarizer and the bismuth-substituted iron garnet crystal (which was adjusted to θf=45° by a wavelength of 1.31 μm) was prepared as a magnetic garnet crystal. These optical elements were subjected to polishing sufficiently to achieve a surface roughness Ra of 0.3 nm or less.

After that, the antireflection film for a glass (a single-layer film of $Al_2O_3$, $TiO_2$ or $SiO_2$ or a three-layer film of $Al_2O_3/TiO_2/SiO_2$) was formed on the both sides of Bi substituted iron garnet crystals. On the other Bi substituted iron garnet crystals, the antireflection film for a glass was not formed. Ask for the polarizing glass, the antireflection film for air ($Al_2O_3/SiO_2$ film) was formed only on an unbonded surface. These antireflection films were optimized by a wavelength of 1.31 μm. The detailed physical properties of each optical element are shown in the following Table 1. The data of optical element shown in Table 1 were measured as for the polarizing glass in which the antireflection film was formed on the unbonded surface and the Bi substituted iron garnet crystal in which the antireflection films were formed on both sides.

TABLE 1

| Quality of the material | Polarizer Polarizing glass | Magnetic garnet crystal Bi substituted iron garnet crystal |
| --- | --- | --- |
| Surface roughness (Ra (nm)) | 0.2 – 0.3 | 0.15 – 0.2 |
| Warp (Radius of curvature (m)) | 60 – 80 | 80 – 150 |
| Linear expansion coefficient (/° C.) | $6.5 \times 10^{-6}$ | $11 \times 10^6$ |
| Thickness (m) | $5 - 100 \times 10^5$ | $3.5 \times 10^{-4}$ |

FIG. 2 shows the constitution of an optical device bonded and integrated by using the magnetic garnet crystal on which the antireflection film for a glass was formed. The antireflection film for a glass 3 was formed on both sides of Bi substituted iron garnet crystal 1 and the antireflection film for air 4 was formed on only unbonded surface of the polarizing glass 2, and then the bonded surface of the polarizing glass 2 and the bonded surface of the antireflection film 3 for a glass on the Bi substituted iron garnet crystal 1 were bonded, to produce the optical device 5.

The procedure for bonding the Bi substitution garnet crystal and the polarizing glass was performed according to the flow shown in FIG. 1. Main production conditions of each step are shown below.
(1) Polishing: polishing is performed so that the surface roughness of each optical element may be a value shown in Table 1.
(2) Cleaning: after UV (ultraviolet ray) treatment using a low-pressure mercury lamp, cleaning with pure water (US (Ultra Sonic) cleaning) is performed.
(3) Hydrophilic treatment: each optical element is immersed in mixed solution of aqueous ammonia: hydrogen peroxide solution: pure water=1:1:4.
(4) Cleaning and Drying: IPA vapor drying is performed after cleaning with pure water (US cleaning).
(b 5) Liquid application: pure water is applied to the bonding surface of each optical element.
(6) Sticking: the Bi substituted iron garnet crystal and the polarizing glass are stuck before the applied liquid is dried.
(7) Drying: vacuum drying is conducted for 24 hours after sticking.
(8) Heat treatment: the heat treatment is carried out in air at 110° C. and for 10 hours, the rate of increasing temperature is 4° C./h.

After conducting the heat treatment of the step (8), the obtained bonded body (optical device 5) was cut to a chip with a size of 1 mm×1 mm using a dicer. This chip was treated by a pressure cooker at 105° C. for 100 hours, and then the bonded surface was observed to evaluate the durability of the bonded surface. The results are shown in the following Table 2.

TABLE 2

| Thickness of a polarizer $t2$ | $(\alpha1-\alpha2) \times t2$ | No Oxide film | metal oxide film on a magnetic garnet crystal | | | Three-layer film |
|---|---|---|---|---|---|---|
| | | | $Al_2O_3$ | $TiO_2$ | $SiO_2$ | |
| $5 \times 10^{-5}$ | $0.23 \times 10^{-9}$ | Δ | ○ | ○ | ○ | ○ |
| $10 \times 10^{-5}$ | $0.45 \times 10^{-9}$ | Δ | ○ | ○ | ○ | ○ |
| $15 \times 10^{-5}$ | $0.68 \times 10^{-9}$ | Δ | ○ | ○ | ○ | ○ |
| $20 \times 10^{-5}$ | $0.90 \times 10^{-9}$ | Δ | ○ | ○ | ○ | ○ |
| $40 \times 10^{-5}$ | $1.80 \times 10^{-9}$ | X | Δ | Δ | ○ | ○ |
| $60 \times 10^{-5}$ | $2.70 \times 10^{-9}$ | X | Δ | Δ | Δ | Δ |
| $100 \times 10^{-5}$ | $4.50 \times 10^{-9}$ | X | X | X | Δ | Δ |

○: No delamination, Δ: Small delamination, X: Large delamination

As shown in Table 2, in the optical devices wherein the relation between the linear expansion coefficients α1 and α2 of the Bi substituted iron garnet crystal and the polarizing glass the thickness t2 of the polarizing glass, that is the value of $(\alpha1-\alpha2) \times t2$, was $1.8 \times 10^{-9}$ or more, delamination of the bonded surface was large, which was problem on practical use. On the contrary, when $(\alpha1-2) \times t2$ was smaller than $1.8 \times 10^{-9}$ (desirably $1.0 \times 10^{-9}$ or less), there is little corrosion in the bonded surface, and it turned out that the bonding strength was improved. Moreover, the bonding strength of these wherein the metal oxide film was formed on the Bi substituted iron garnet crystal was improved further, and these having the value of $(\alpha1-\alpha2) \times t2$ smaller than $1.8 \times 10^{-9}$ were reliable optical devices having sufficient bonding strength.

Example 2

Then, influence of thickness of a polarizer oil optical properties was experimented.

Several kinds of polarizing glasses that differ in thickness were prepared as a polarizer as in Example 1, and one kind of Bi substituted iron garnet crystal of which only the three-layer film of $Al_2O_3/TiO_2/SiO_2$ as an antireflection film for a glass was formed on the both sides was prepared as the magnetic garnet crystal. These optical (elements were bonded under the same conditions as Example 1, and thus the bonded body (optical device 5) was produced. In addition, the various optical glasses that differ in linear expansion coefficient were substituted for the polarizing glass in this experiment.

Figure 3:
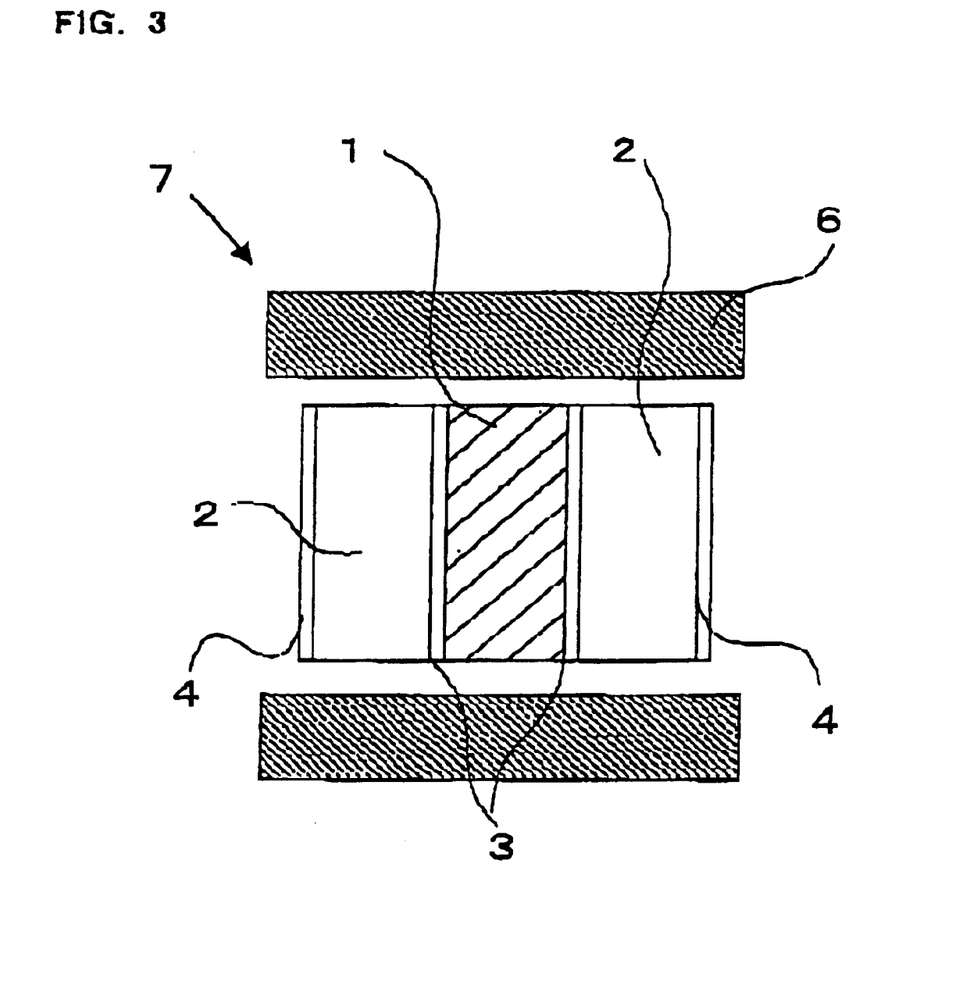
FIG. 3 is a schematic view of a bonding type optical isolator produced in Example 2.

Then, as shown in FIG. 3, the obtained optical device 5 was cut to a chip with a size of 1×1 mm, and installed into a cylindrical magnet 6, to constitute the optical isolator 7. Then, the extinction ratio was measured as for each of obtained optical isolators that differ in thickness of the polarizing glass.

Figure 5:
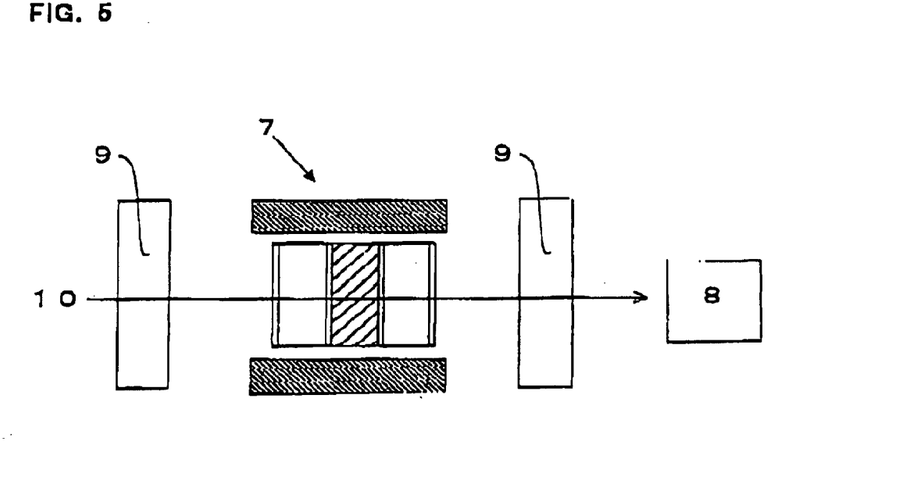
FIG. 5 is a schematic view showing a constitution for extinction-ratio measurement of an optical isolator in Example 2.

Measurement of the extinction ratio was performed, as shown in FIG. 5, by transmitting the beam 10 emitted from the light source (unillustrated) through the polarizer 9 arranged outside temporarily to the optical isolator 7 (substituted polarizing glass by the various optical glasses that differ in linear expansion coefficient), and detecting the transmitted beam 10 through the polarizer 9 (analyzer) again with a detector 8.

At this time, the measurement temperature was set at the optical-element temperature in the step (7) of the above-mentioned FIG. 1 or the temperature lower 40° C. than the optical-element temperature. The optical strain was evaluated by measuring the difference in the extinction ratio (the amount of degradation of the extinction ratio) at this time. As described above, by measuring at the temperature lower 40° C. than the optical-element temperature, the extinction ratio can be measured in the state that thermal stress is applied to a bonded surface. All of the extinction ratio of each sample measured at the optical-element temperature in the step (7) were about 50 dB.

Figure 4:
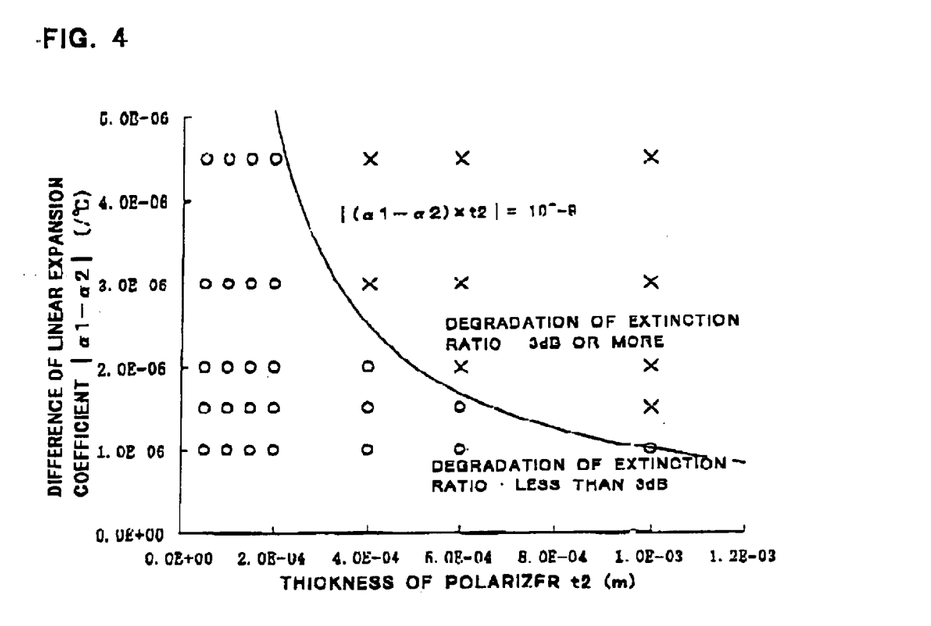
FIG. 4 is a graph on which the amount of degradation of the extinction ratio is plotted in relation to a thickness of a polarizer and difference in linear expansion coefficient between optical elements.

FIG. 4 shows the two dimensional map as for thickness t2 (m) of the polarizing glass and difference $|\alpha1-\alpha2|$ (/° C.) of the linear expansion coefficient between the Bi substituted iron garnet crystal and the polarizing glass. On this map, ○ was plotted in the case that the amount of degradation of the extinction ratio was less than 3 dB, and X was plotted in the case that it was 3 dB or more. As shown in FIG. 4, the solid line which shows the boundary of the plots of ○ and X can be expressed by the formula: $(\alpha1-\alpha2)=10^{-9}/L2$. Therefore, it was confirmed that the condition required in order to obtain the optical device having high optical properties such that the amount of degradation of the extinction ratio is less than 3 dB is $|(\alpha1-\alpha2) \times t2 \leq 10^{-9}$.

Examples 3–10

As for the optical elements used for bonding, a polarizing glass as a polarizer and a bismuth-substituted iron garnet crystal (which was adjusted to θf=45° by a wavelength of 1.31 μm) as a magnetic garnet crystal were prepared. These optical elements were subjected to polishing sufficiently, to control the surface-roughness Ra to 0.3 nm or less.

Then, there were prepared Bi substituted iron garnet in which the antireflection film for a glass (a single-layer film of $Al_2O_3$, $TiO_2$ or $SiO_2$, or a three-layer film of $Al_2O_3/TiO_2/SiO_2$) was formed on the both sides, and the same in which the antireflection film for a glass was not formed. On the other hand, the antireflection film for an air ($Al_2O_3/SiO_3$ film) was formed only on the unbonded surface of the polarizing glass. These antireflection films were optimized by a wavelength of 1.31 μm. The detailed physical properties of the magnetic garnet crystal and the polarizer are shown in the following table 3. The data shown in Table 3 were measured as for the polarizer in which the antireflection film was formed on the unbonded surface and the magnetic garnet crystal in which the antireflection films were formed on both sides.

TABLE 3

| Quality of the material | Polarizer Polarizing glass | Magnetic garnet Crystal Bi substituted iron garnet crystal |
|---|---|---|
| Surface roughness (Ra (nm)) | 0.2 – 0.3 | 0.15 – 0.2 |
| Warp (Radius of curvature (m)) | 60 – 80 | 80 – 150 |
| Linear expansion coefficient (/° C.) | $6.5 \times 10^{-6}$ | $11 \times 10^6$ |

TABLE 3-continued

| Quality of the material | Polarizer Polarizing glass | Magnetic garnet Crystal Bi substituted iron garnet crystal |
|---|---|---|
| Thickness (mm) | 0.2 | 0.35 |

FIG. 7 shows the constitution of an optical device bonded and integrated by using the magnetic garnet crystal on which the antireflection film for a glass was formed. The optical device 15 was produced by forming the antireflection film 13 for a glass on both sides of the magnetic garnet crystal 11 and forming the antireflection film 14 for air only on the unbonded surface of the polarizer 12, and then bonding the bonded surface of the polarizer 12 and the antireflection film 13 for a glass on the magnetic garnet crystal 11.

The procedure of bonding the polarizer and the magnetic garnet crystal was performed according to the flow shown in FIG. 6, and the optical device was produced. Main production conditions of each step are shown below.

(1') Polishing: polishing is performed so that the surface roughness of the magnetic garnet crystal and the polarizer may be 0.3 nm or less.

(2') Cleaning: after UV treatment using a low-pressure mercury lamp, cleaning with pure water (US cleaning) is perfromed.

(3') Hydrophilic treatment: each optical element is immersed in a mixed solution of aqueous ammonia: hydrogen peroxide solution: pure water=1:1:4.

(4') Cleaning: IPA vapor drying is performed after cleaning with pure water (US cleaning).

(5') Heating: the optical elements are heated at 40° C. to 100° C.

(6') Liquid application: pure water is applied to the bonding surface of each of the optical elements.

(7') Sticking: the magnetic garnet crystal and the polarizer are stuck before the pure water is dried (8') Drying: vacuum drying is conducted for 24 hours after sticking. In this occasion, the temperature of the optical elements is set to 25 to 70° C.

(9') Heat treatment: the heat treatment is carried out at 110° C. and for 1.0 hours in a hydrogen atmosphere at a pressure of 0.2 atmosphere. In this occasion, the rate of increasing temperature is 4° C./h.

Comparative Example

After preparing the same polarizing glass and Bi substituted iron garnet crystal as the above-mentioned Examples 3–10, the same antireflection film as Examples 3–10 was formed on each of the optical elements, which were then bonded. At this time, the optical device was produced under the same conditions as the above-mentioned bonding conditions except that the optical elements were stuck each other without performing heating (step (5')) shown in the flow of FIG. 6.

After conducting the heat-treating of step (9'), the bonded surface of each of the obtained optical devices (Examples 3–10 and Comparative example) was evaluated. Each of the obtained optical devices was cut into a chip with a size of 1×1 mm by a dicer, the obtained chip was stored in a closed container at 105° C. and 100% of relative humidity for 100 hours (hereafter referred to as a pressure-cooker test (PCT)), and then each bonded surface was observed. In observation of the bonded surface, the evaluation was performed in such a way that the case that the bonded surface is delaminated when it is cut by the dicer was shown as X, the case that corrosion was generated at the bonded surface after PCT was shown as Δ, and the case that corrosion was not generated at the bonded surface after PCT was shown as ○.

There were shown in the following Table 4 the temperature of the optical elements in sticking, the temperature of the optical element kept after sticking until the heat treatment, and the result to observation of the bonded surface of the resultant optical device.

TABLE 4

| Sample | Temperature in Sticking (° C.) | Temperature until heat treatment (° C.) | No Oxide Film | metal oxide film on magnetic garnet crystal | | | |
|---|---|---|---|---|---|---|---|
| | | | | $Al_2O_3$ | $TiO_2$ | $SiO_2$ | Three layer film |
| Example 3 | 100 | 70 | ○ | ○ | ○ | ○ | ○ |
| Example 4 | 70 | 70 | Δ | ○ | ○ | ○ | ○ |
| Example 5 | 100 | 40 | ○ | ○ | ○ | ○ | ○ |
| Example 6 | 70 | 40 | Δ | ○ | ○ | ○ | ○ |
| Example 7 | 40 | 40 | Δ | Δ | Δ | ○ | ○ |
| Example 8 | 100 | 25 | Δ | Δ | Δ | ○ | ○ |
| Example 9 | 70 | 25 | Δ | ○ | ○ | ○ | ○ |
| Example 10 | 40 | 25 | Δ | Δ | Δ | ○ | ○ |
| Comparative Example | 25 | 25 | X | X | X | Δ | Δ |

○: no corrosion on the bonded surface
Δ: corrosion generates by PCT
X: delaminated by dicing.

As shown in Table 4, the optical device produced by the present invention, i.e., any of the optical devices of Examples 3–10 produced by heating optical elements, then sticking the heated optical elements each other, were bonded with sufficient bonding strength, without causing delamination at the time of dicer cutting.

Moreover, when Examples 3–10 were compared, the bonding strength of a bonded surface was increased in the optical device in which the metal oxide film, especially the single-layer film of $SiO_2$ and the three-layer film of $Al_2O_3/TiO_2/SiO_2$ was formed on the magnetic garnet. Furthermore, by keeping the temperature of the optical elements at 40° C. or more after sticking optical elements until performing the heat treatment, the bonding strength could be increased further and the more highly reliable optical device could be manufactured.

On the other hand, in the comparative example in which optical elements are stuck each other without heating the optical elements, the bonded surface was delaminated during cutting by a dicer in the case that an oxide film is not formed on the magnetic garnet crystal. Moreover, the bonding strength was not sufficient even in the case that the oxide film was formed on the magnetic garnet crystal. In the case that the single-layer film of $Al_2O_3$ and the single-layer film of $TiO_2$ as an antireflection film was formed, the bonded surface was delaminated at the time of dicer cutting. In the case that the single-layer film of $SiO_2$, and the three-layer film of $Al_2O_3/TiO_2/SiO_2$ was formed, large corrosion was generated on the bonded surface after PCT.

Examples 11–14

As an optical element used for bonding, the polarizing glass and the bismuth-substituted iron garnet crystal (which was adjusted to θf-45° by the wavelength of 1.31 μm) were prepared, as in the above-mentioned Example, and these optical elements were subjected to polishing sufficiently. At this time, two kinds of Bi substituted iron garnets with surface-roughness Ra of 0.15 nm and 0.50 nm were prepared.

Then, as for the Bi substituted iron garnet, the three-layer film of $Al_2O_3/TiO_2/SiO_2$ as the antireflection film for a glass was formed on the both sides. As for the polarizing glass, the $Al_2O_3/SiO_2$ film as the antireflection film for air was formed only on the unbonded surface. These antireflection films were optimized by a wavelength of 1.31 μm.

As for the bonding procedure of optimal elements, the optical device were produced by two kinds of method for bonding, namely a method for bonding according to the flow shown in FIG. 6, and a method of sticking directly the optical elements each other (step (7')) after heating of step (5') without applying pure water to the bonded surface of the optical elements (step (6')), and then performing the heat treatment without drying (step (8')). At that time, the optical elements were heated at 70° C. in heating of the step (5'), and the temperature of the optical elements were kept at 40° C. after sticking the optical elements until performing the heat treatment. Moreover, when sticking the optical elements, the polarizer were adjusted so that polarized wave directions of two polarizers may become 45° each other, and then the magnetic garnet crystal and the polarizers were stuck. The other bonding conditions were same as these of the above-mentioned Examples 3–10.

Figure 8:
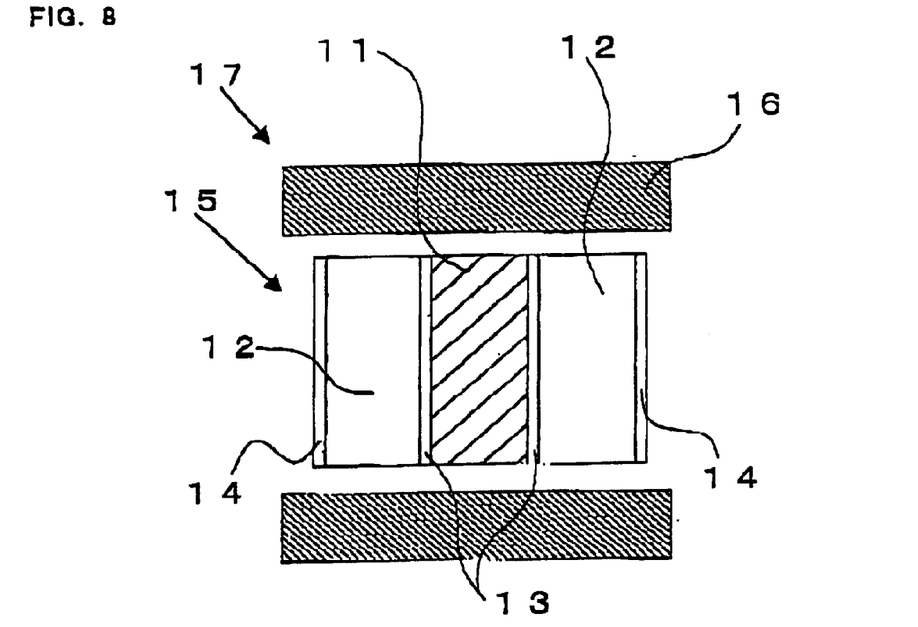
FIG. 8 is a schematic view of a bonding type optical isolator produced in Examples 11–14.
Figure 9:
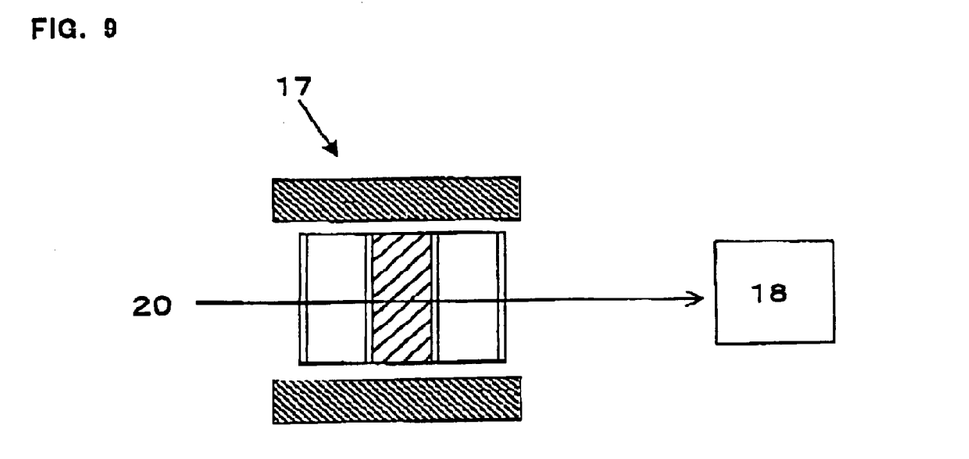
FIG. 9 is a schematic view showing a constitution for measuring a forward direction insertion loss of an optical isolator in Examples 11–14.

First, each of the optical devices obtained as described above was cut into a chip 1×1 mm and the cut optical device 15 was installed into the cylinder type magnet 16, to constitute the optical isolator 17 as shown in FIG. 8. PCT was performed as for each of the produced optical isolators in a similar manner to the method described above, and bonded surface was observed. Moreover, the forward direction insertion loss of the optical isolator was measured by laser beam having a wavelength of 1.31 μm before and after PCT. Then measurement of the forward direction insertion loss was performed by transmitting the beam 20 emitted from the light source (unillustrated) to the optical isolator 17, and detecting the transmitted beam 20 with a detector 18, as shown in FIG. 9.

The observation results of the bonded surface of each sample and the measurement results of the forward direction insertion loss before and after PCT are shown in the following Table 5.

TABLE 5

| Sample | Surface roughness of magnetic garnet crystal (nm) | Method of sticking | State of bonded surface | Forward direction insertion loss (dB) Before PCT | After PCT |
|---|---|---|---|---|---|
| Example 11 | 0.15 | bonded via pure water | ○ | 0.124 | 0.124 |
| Example 12 | 0.50 | bonded via pure water | ○ | 0.125 | 0.127 |
| Example 13 | 0.15 | bonded directly | ○ | 0.121 | 0.128 |
| Example 14 | 0.50 | bonded directly | Δ | 0.130 | 0.139 |

○: no corrosion on a bonded surface
Δ: corrosion generates by PCT.

As shown in Table 5, even if the optical element having a coarse surface is used, the optical device bonded with sufficient bonding strength could be manufactured. Moreover, when optical elements were stuck through solution (pure water), there is no corrosion on the bonded surface after PCT, and bonding with still higher bonding strength could be achieved. Furthermore, since the optical device produced by the present invention is excellent in the bonding state of the bonded surface, the forward direction insertion loss can be reduced, and the properties are never lowered even after PCT. Accordingly there can be produced the optical device which has the excellent optical properties. As described above, according to the present invention, even when the optical elements of which surface is not fully controlled are bonded, a highly reliable and highly efficient optical device can be produced. Moreover, by bonding optical elements each other through solution, bonding strength can be increased further and a more reliable optical device can be manufactured.

The present invention is not limited to the above-described embodiment. The above-described embodiment is a mere example, and those having the substantially same structure as that described in the appended claims and providing the similar action and effects are included in the scope of the present invention.

For example, although the optical isolator constituted by the smallest unit in which the polarizers were bonded to both sides of the magnetic garnet crystal was shown in the above embodiment, the present invention is not limited thereto, and can be applied to the optical isolator constituted by the multistage structure which is formed by further combining polarizers and magnetic garnet crystals. Moreover, the production method of the present invention can also be applied in the case that a polarizer is bonded to a magnetic garnet crystal through a transparent optical material such as buffer glass.

Moreover, although the magnetic garnet crystal and the polarizer are bonded with applying pure water to the bonded surface in the above embodiment, the present invention is not limited thereto. If sufficient bonding strength can be obtained, they may be bonded directly without using a solution.

What is claimed is:

1. A method for producing an optical device by bonding optical elements each other without using adhesive wherein the optical elements are bonded to each other by using optical elements in which the relation between linear expansion coefficients α1 and α2 (/° C.) of each of the optical elements to be bonded and thickness t2

(m) of one of the optical elements satisfies the following formula:

$$|(\alpha 1-\alpha 2)\times t2|\leq 10^{-9} \text{ and } t2\geq 2\times 10^{-5};$$

and, by sticking the optical elements to each other in the state of being heated, and then subjecting them to a heat treatment.

2. An optical device formed by bonding a polarizer to at least one surface of a magnetic garnet crystal without using adhesive which functions by transmitting light through the bonded surface, wherein the relation between linear expansion coefficient $\alpha 1$ (/° C.) of the magnetic garnet crystal, linear expansion coefficient $\alpha 2$ (/° C.) of the polarizer and thickness t2 (m) of the polarizer satisfies the following formula: $|(\alpha 1-\alpha 2)\times t2|\leq 10^{-9}$ and $t2\geq 2\times 10^{-5}$.

3. The optical device according to claim 2 wherein a metal oxide film is formed on the surface to be bonded to the polarizer of the magnetic garnet crystal.

4. The optical device according to claim 3 wherein the metal oxide film formed on the magnetic garnet crystal consists of one kind or two or more kinds of metal oxide films selected from $Al_2O_3$, $TiO_2$ and $SiO_2$, and the metal oxide film has a structure laminated in a single-layer or a multilayer.

5. The optical device according to claim 2 wherein the polarizer is a polarizing glass.

6. The optical device according to claim 2 wherein the magnetic garnet crystal is a bismuth-substituted iron garnet crystal.

7. The optical device according to claim 2 wherein the optical device is an optical isolator.

8. A method for producing an optical device by bonding a polarizer to at least one surface of a magnetic garnet crystal without using adhesive wherein the bonding is performed by using the magnetic garnet crystal and the polarizer in which the relation between linear expansion coefficient $\alpha 1$ (/° C.) of the magnetic garnet crystal, linear expansion coefficient $\alpha 2$ (/° C.) of the polarizer, and thickness t2 (m) of the polarizer satisfies the following formula: $|(\alpha 1-\alpha 2)\times t2|\leq 10^9$ and $t2\geq 2\times 10^{-5}$.

9. The method for producing an optical device according to claim 8 wherein the magnetic garnet crystal and the polarizer are bonded by subjecting each of the bonded surfaces to polishing, cleaning, hydrophilic treatment and drying, and then sticking the bonded surfaces directly or through a solution, followed by subjecting them to a heat treatment.

10. The method for producing an optical device according to claim 9 wherein as the solution used when the magnetic garnet crystal and the polarizer are bonded, a solution containing as a main component polar molecules is used independently or by mixture.

11. The method for producing an optical device according to claim 8 wherein the magnetic garnet crystal and the polarizer are bonded after forming a metal oxide film on the bonded surface of the magnetic garnet crystal which is to be bonded to the polarizer.

12. The method for producing an optical device according to claim 11 wherein the metal oxide film formed on the magnetic garnet crystal consists of one kind or two or more kinds of metal oxide films selected from $Al_2O_3$, $TiO_2$ and $SiO_2$, and the metal oxide film is laminated in a single-layer or a multilayer.

13. The method for producing an optical device according to claim 8 wherein an optical isolator is manufactured by bonding the polarizer to the magnetic garnet crystal.

* * * * *